US011276027B2

(12) United States Patent
Li et al.

(10) Patent No.: US 11,276,027 B2
(45) Date of Patent: *Mar. 15, 2022

(54) OBJECT ITEM DISTRIBUTION METHOD AND APPARATUS

(71) Applicant: Tencent Technology (Shenzhen) Company Limited, Shenzhen (CN)

(72) Inventors: Long Li, Shenzhen (CN); Li Huang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 58 days.

This patent is subject to a terminal disclaimer.

(21) Appl. No.: 16/854,577

(22) Filed: Apr. 21, 2020

(65) Prior Publication Data

US 2020/0250619 A1    Aug. 6, 2020

Related U.S. Application Data

(63) Continuation of application No. 15/692,185, filed on Aug. 31, 2017, now Pat. No. 10,664,794, which is a
(Continued)

(30) Foreign Application Priority Data

Nov. 16, 2015 (CN) .......................... 201510784045.7

(51) Int. Cl.
*G06Q 10/08* (2012.01)
*G06Q 30/06* (2012.01)
(Continued)

(52) U.S. Cl.
CPC ... *G06Q 10/08355* (2013.01); *G06Q 30/0637* (2013.01); *G06Q 30/0639* (2013.01); *G06Q 50/28* (2013.01); *G06Q 50/10* (2013.01)

(58) Field of Classification Search
CPC ............. G06Q 10/08355; G06Q 50/28; G06Q 30/0639; G06Q 30/0637; G06Q 50/10
See application file for complete search history.

(56) References Cited

U.S. PATENT DOCUMENTS

| 8,224,707 B1 * | 7/2012 | Smith ............... G06Q 30/0601 705/26.1 |
| 2012/0173308 A1 * | 7/2012 | Brown .................. G06Q 50/01 705/14.1 |

(Continued)

FOREIGN PATENT DOCUMENTS

| CN | 102999847 A | 3/2013 |
| CN | 104484787 A | 4/2015 |

(Continued)

OTHER PUBLICATIONS

Devari, Aashwinikumar. "Crowdsourced Last Mile Delivery Using Social Networks". Retrieved from <https://www.acsu.buffalo.edu/~qinghe/thesis/2016-01%20Aashwin%20MS%20Order%20Fulfillment.pdf>. Masters Thesis for Department of Industrial and Systems Engineering, SUNY Buffalo. Jan. 2016. (Year: 2016).*

(Continued)

*Primary Examiner* — Nathan A Mitchell
(74) *Attorney, Agent, or Firm* — Morgan, Lewis & Bockius LLP

(57) ABSTRACT

An object item distribution method is performed at a computer server that hosts a social networking application with which an enterprise user has an official account and an enterprise account, the method including: receiving a distribution request sent by a requesting user to the official account, the distribution request being generated after the requesting user purchases an item by using the requesting user's account; determining, according to the distribution request, the item purchased by the requesting user and a location of the requesting user; determining, according to
(Continued)

the location of the requesting user, a distribution user that meets a preset condition from distribution users of the enterprise account; and sending a distribution instruction to the distribution user that meets the preset condition, the distribution instruction being used for instructing a courier of the distribution user that meets the preset condition to distribute the item to the requesting user.

17 Claims, 8 Drawing Sheets

Related U.S. Application Data continuation-in-part of application No. PCT/CN2016/105208, filed on Nov. 9, 2016.

(51) Int. Cl.
*G06Q 50/28* (2012.01)
*G06Q 50/10* (2012.01)

(56) References Cited

U.S. PATENT DOCUMENTS

| | | | | |
|---|---|---|---|---|
| 2012/0210244 | A1* | 8/2012 | de Francisco Lopez | H04L 63/102 715/747 |
| 2013/0006816 | A1* | 1/2013 | Nuzzi | G06Q 30/0261 705/27.1 |
| 2013/0198096 | A1* | 8/2013 | Lynch | G06Q 50/01 705/319 |
| 2014/0101161 | A1* | 4/2014 | Khalil | G06Q 10/107 707/738 |
| 2014/0164278 | A1 | 6/2014 | Cattoor et al. | |
| 2014/0293322 | A1* | 10/2014 | Anurag | G06F 3/1285 358/1.15 |
| 2015/0161564 | A1* | 6/2015 | Sweeney | G06Q 10/063114 705/338 |
| 2015/0186869 | A1* | 7/2015 | Winters | G06Q 50/28 705/26.81 |
| 2015/0227890 | A1* | 8/2015 | Bednarek | G06Q 30/0635 705/26.81 |
| 2016/0019501 | A1* | 1/2016 | Olechko | G06Q 10/08355 705/338 |
| 2016/0104113 | A1* | 4/2016 | Gorlin | G06Q 10/08355 705/338 |
| 2016/0300184 | A1* | 10/2016 | Zamer | G06Q 30/016 |
| 2016/0300185 | A1* | 10/2016 | Zamer | G06Q 10/08355 |
| 2017/0116562 | A1* | 4/2017 | Schroeder | G06Q 10/083 |
| 2017/0116570 | A1* | 4/2017 | Schroeder | G06Q 50/01 |
| 2018/0285806 | A1* | 10/2018 | Scofield | G06Q 10/08 |

FOREIGN PATENT DOCUMENTS

| | | |
|---|---|---|
| CN | 104751272 A | 7/2015 |
| CN | 105279631 A | 1/2016 |

OTHER PUBLICATIONS

"Using the 'Crowd' to Deliver Packages". USPSOIG Issue In Focus. Retrieved from <https://www.uspsoig.gov/sites/default/files/document-library-files/2015/using_the_crowd_to_deliver_packages_0.pdf>. Feb. 2014. (Year: 2014).*

J. V. Nickerson and S. Olariu, "Courier Assignment in Social Networks," 2007 40th Annual Hawaii International Conference on System Sciences (HICSS'07), 2007, pp. 46-46 (Year: 2007).*

Leveraging Socially Networked Mobile ICT Platforms for the Last-Mile Delivery Problem Kyo Suh, Timothy Smith, and Michelle Linhoff Environmental Science & Technology 2012 46 (17), 9481-9490 (Year: 2012).*

Hodson, Hal. "Parcels find their way to you via the crowd". Retrieved from <https://institutions.newscientist.com/article/mg21829175-500-parcels-find-their-way-to-you-via-the-crowd/> on Aug. 13, 2021. Originally published May 2013. (Year: 2013).*

Tencent Technology, ISRWO, PCT/CN2016/105208, Feb. 6, 2017, 9 pgs.

Tencent Technology, IPRP, PCT/CN2016/105208, May 22, 2018, 8 pgs.

Devari, "Crowdsourced Last Mile Delivery Using Social Networks", Retrieved from <https:// www.acsu.buffalo.edu/-qinghe/thesis/2016-01%20Aashwin%20MS%20Order%20Fulfillment.pdf>. Masters Thesis for Department of Industrial and Systems Engineering, SUNY Buffalo, Jan. 2016, 48 pgs.

Author Unknown, "Using the 'Crowd' to Deliver Packages", Retrieved from <https://www.uspsoig.gov/sites/default/files/document-library-files/2015/using_the_crowd_to_deliver_Packages_O.pdf> on Nov. 22, 2019, Published Feb. 2014, 5 pgs.

Nickerson et al., "Courier Assignment in Social Networks", Proceedings of the 40th Hawaii International Conference on System Sciences, 2007, 10 pgs.

* cited by examiner

OBJECT ITEM DISTRIBUTION METHOD AND APPARATUS

PRIORITY CLAIM AND RELATED APPLICATION

This application is a continuation application of U.S. patent application Ser. No. 15/692,185, entitled "OBJECT ITEM DISTRIBUTION METHOD AND APPARATUS", filed on Aug. 31, 2017, which is a continuation-in-part application of PCT/CN2016/105208, entitled "ARTICLE DISTRIBUTION METHOD AND APPARATUS" filed on Nov. 9, 2016, which claims priority to Chinese Patent Application No. 201510784045.7, filed with the State Intellectual Property Office of the People's Republic of China on Nov. 16, 2015, and entitled "ARTICLE DISTRIBUTION METHOD AND APPARATUS", all of which are incorporated herein by reference in their entirety.

FIELD OF THE TECHNOLOGY

The present disclosure relates to the field of computer technologies, and in particular, to an object item distribution method and apparatus.

BACKGROUND OF THE DISCLOSURE

With the development of electronic commerce, increasingly more object item requesting users purchase object items on online shopping malls. Most information exchange platforms develop correspondingly an online shopping mall function. After an object item requesting user purchases an object item, a seller needs to arrange a courier to distribute the purchased object item to the object item requesting user.

An object item distribution method provided in a related technology includes: after an object item requesting user completes paying for a selected object item on an information exchange platform, the information exchange platform sends address information of the object item requesting user to a social networking server, the social networking server notifies a seller to send the object item to the object item requesting user that corresponds to the address information, and the seller contacts a courier to distribute the object item.

When the seller owns multiple stores, a person in charge needs to determine a nearest store according to the address information filled in by the object item requesting user, and notifies a salesperson in the nearest store to contact a courier to distribute the object item. The distribution arrangement process is relatively time-consuming.

SUMMARY

To resolve a problem of time consumed in a distribution process, embodiments of the present invention provide an object item distribution method and apparatus. The technical solutions are as follows:

According to a first aspect, an object item distribution method is provided, where the method includes:

receiving a distribution request sent by an object item requesting user, the distribution request being generated after the object item requesting user purchases an object item by using the object item requesting user and by using an official account, the official account being an identifier of a seller of the object item on an information exchange platform;

determining, according to the distribution request, the object item purchased by the object item requesting user and a location of the object item requesting user;

determining, according to the location of the object item requesting user, a distribution user that meets a preset condition from distribution users of the enterprise account.

According to a second aspect, an object item distribution method is provided, where the method includes:

receiving a distribution instruction sent by an enterprise user, the distribution instruction being sent by the enterprise user after receiving a distribution request sent by an object item requesting user, determining, according to the distribution request, the object item purchased by an object item requesting user and a location of the object item requesting user, and determining, according to the location of the object item requesting user, a distribution user that meets a preset condition from distribution users of the enterprise account, the distribution request being generated after the object item requesting user purchases the object item by using the object item requesting user and by using the official account, and the official account being an identifier created by a seller of the object item on an information exchange platform; and instructing a courier of the distribution user to distribute the object item to the object item requesting user.

According to a third aspect, an object item distribution apparatus is provided, where the apparatus includes:

a request receiving module, configured to receive a distribution request sent by an object item requesting user, the distribution request being generated after the object item requesting user purchases an object item by using the object item requesting user and by using an official account, the official account being an identifier of a seller of the object item on an information exchange platform;

an information determining module, configured to determine, according to the distribution request obtained by the request receiving module, the object item purchased by the object item requesting user and location of the object item requesting user;

a client determining module, configured to determine, according to the location that is of the object item requesting user and that is determined by the information determining module, a distribution user that meets a preset condition from distribution users of the enterprise account; and an instruction sending module, configured to send a distribution instruction to the distribution user that meets the preset condition and that is determined by the client determining module, the distribution instruction being used for instructing a courier of the distribution user that meets the preset condition to distribute the object item to the object item requesting user.

According to a fourth aspect, an object item distribution apparatus is provided, where the apparatus includes:

an instruction receiving module, configured to receive a distribution instruction sent by an enterprise user, the distribution instruction being sent by the enterprise user after receiving a distribution request sent by an object item requesting user, determining, according to the distribution request, the object item purchased by an object item requesting user and a location of the object item requesting user, and determining, according to the location of the object item requesting user, a distribution user that meets a preset condition from distribution users of the enterprise account, the distribution request being generated after the object item requesting user purchases the object item by using the object item requesting user and by using the official account, and the official account being an identifier created by a seller of the object item on an information exchange platform; and a distribution instruction module, configured to instruct a courier of the distribution user to distribute the object item to the object item requesting user.

The technical solutions provided in the embodiments of the present invention have the following beneficial effects:

An object item purchased by an object item requesting user and a location of the object item requesting user is determined according to a distribution request, the distribution request being sent by an object item requesting user after successfully purchasing the object item from an enterprise user by using a following official account; a distribution user that meets a preset condition is determined, according to the location of the object item requesting user from distribution users that follow the official account; a distribution instruction is sent to the distribution user, the distribution instruction being used for instructing a courier of the distribution user to distribute the object item to the object item requesting user. The distribution user may be directly determined by using the enterprise user, and then the distribution instruction is sent to the distribution user, and the courier may be instructed to distribute the object item to the object item requesting user, thereby resolving a time consumption problem in a distribution process that a person in charge of a seller store needs to determine a nearest store according to address information filled in by an object item requesting user and notify a salesman of the nearest store to contact a courier to distribute an object item, so that distribution efficiency is improved.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the embodiments of the present invention in detail with reference to the accompanying drawings.

Figure 1:
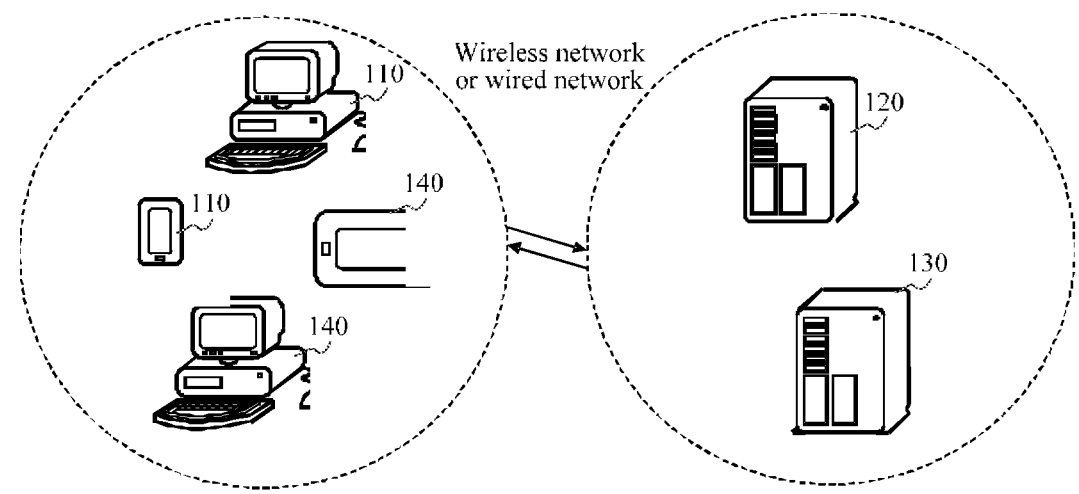
FIG. 1 is a diagram of an implementation scenario that is related to an embodiment of the present invention.

Referring to FIG. 1, FIG. 1 is a diagram of an implementation scenario that is related to an embodiment of the present invention. FIG. 1 includes: a terminal used by an object item requesting user 110, a social networking server 120, a terminal used by an enterprise user 130, and a terminal used by a distribution user 140. The social networking server 120 typically includes one or more processing units (CPU's) for executing modules, programs and/or instructions stored in memory and thereby performing processing operations; one or more network or other communications interfaces; and one or more communication buses for interconnecting these components. The communication buses optionally include circuitry (sometimes called a chipset) that interconnects and controls communications between system components. The memory includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory may optionally include one or more storage devices remotely located from the CPU(s). The memory, or alternately the non-volatile memory device(s) within memory, comprises a non-transitory computer readable storage medium.

The enterprise user 130 registers an official account with a social networking application running at the social networking server 120. The official account of the enterprise user 130 is a subscription-based user account at the social networking application and a subscription relationship is established after an individual user subscribes to the official account of the enterprise user and the individual user is labeled as an object item requesting user 110 after verifying that the individual user has registered a bank account with the social networking application. The official account is a public social networking identifier created by a user or an organization on the social networking application. The social networking application herein may be implemented on the social networking server 120 so that the object item requesting user 110 can follow the official account of the enterprise user 130. In some embodiments, the enterprise user 130 also registers an enterprise account with the social networking application. The enterprise account of the enterprise user 130 is an invitation-based user account at the social networking application and an affiliation relationship is established after an individual user accepts an invitation to register with the enterprise account of the enterprise user and the individual user is labeled as a distribution user 140 after verifying that the individual user has registered a bank account with the social networking application. The social networking application establishes a mapping relationship between the official account of the enterprise user 130 and the enterprise account of the enterprise user 130.

An information exchange platform refers to a network architecture that contacts people by using a social relationship and/or common interest (or common benefit). Users may perform daily communication and handle some daily affairs by using a client provided by the information exchange platform. Each user may own a network identity that is used for being identified by another user on the information exchange platform.

A user or an organization may create a public social networking identifier on the information exchange platform, and allows people (for example, any user on the information exchange platform) to communicate with the public social networking identifier on the information exchange platform. The communication may be performed based on a one-direction confirmation manner, and mutual confirmation does not need to be performed among users. For example, a user may select to subscribe a public social networking identifier (for example, to "follow" a public social networking identity) message or publish information, and become a social networking contact of the public social networking identifier in such one-direction confirmation manner as subscription. An owner of the public social networking identity may further use another user that subscribes a message or publish information of the owner as a social networking contact of the owner.

Each user and each public social networking identifier on the information exchange platform all have a social networking contact list, so that each user and each public social networking identifier communicate with a user or a public social networking identifier in the social networking contact list of each user and each public social networking identifier in a manner such as an instant messaging message. For example, users in a social group may perform mutual communication by using an interface provided by the information exchange platform. The users may also perform mutual communication by using the interface provided by the information exchange platform.

A client may be an electronic device such as a computer, a smartphone, a tablet computer, or an e-book reader. An application program client of an information exchange platform may be installed on or a browser may be installed on the electronic device, and then the electronic device accesses a web page client of the information exchange platform by using the browser. The client may be divided into, according to different users, an object item requesting user 110 used by an object item requesting user and a distribution user 140 used by a courier. The object item requesting user purchases an object item by using an official account registered by the object item requesting user 110 in an enterprise. The distribution user 140 is instructed by the enterprise user 130 to distribute the object item to the object item requesting user. In addition, the object item requesting user 110 and the distribution user 140 are basically the same.

A server may be connected to a client by using a wired or wireless network. The server may be divided into, according to different applications, a social networking server 120 that serves for a client and an enterprise user 130 that serves for an enterprise. The social networking server 120 may be one or more servers, or may be a cloud computing center. In another word, the social networking server 120 may be implemented by a server, or may be implemented by a combination of multiple servers. Each server bears a same or different function. For example, there is a server used for registration and login, a server used for saving a profile photo of a user, a server used for saving channel information and configuration information, a server used for saving a picture or a video, a server used for serving the object item requesting user 110, and a server used for serving an official account. Alternatively, the social networking server 120 may be implemented by using a cloud computing center. The cloud computing center is a virtual computing platform formed by an entire service cluster. The enterprise user 130 may be one or more servers, or may be a cloud computing center.

Figure 2:
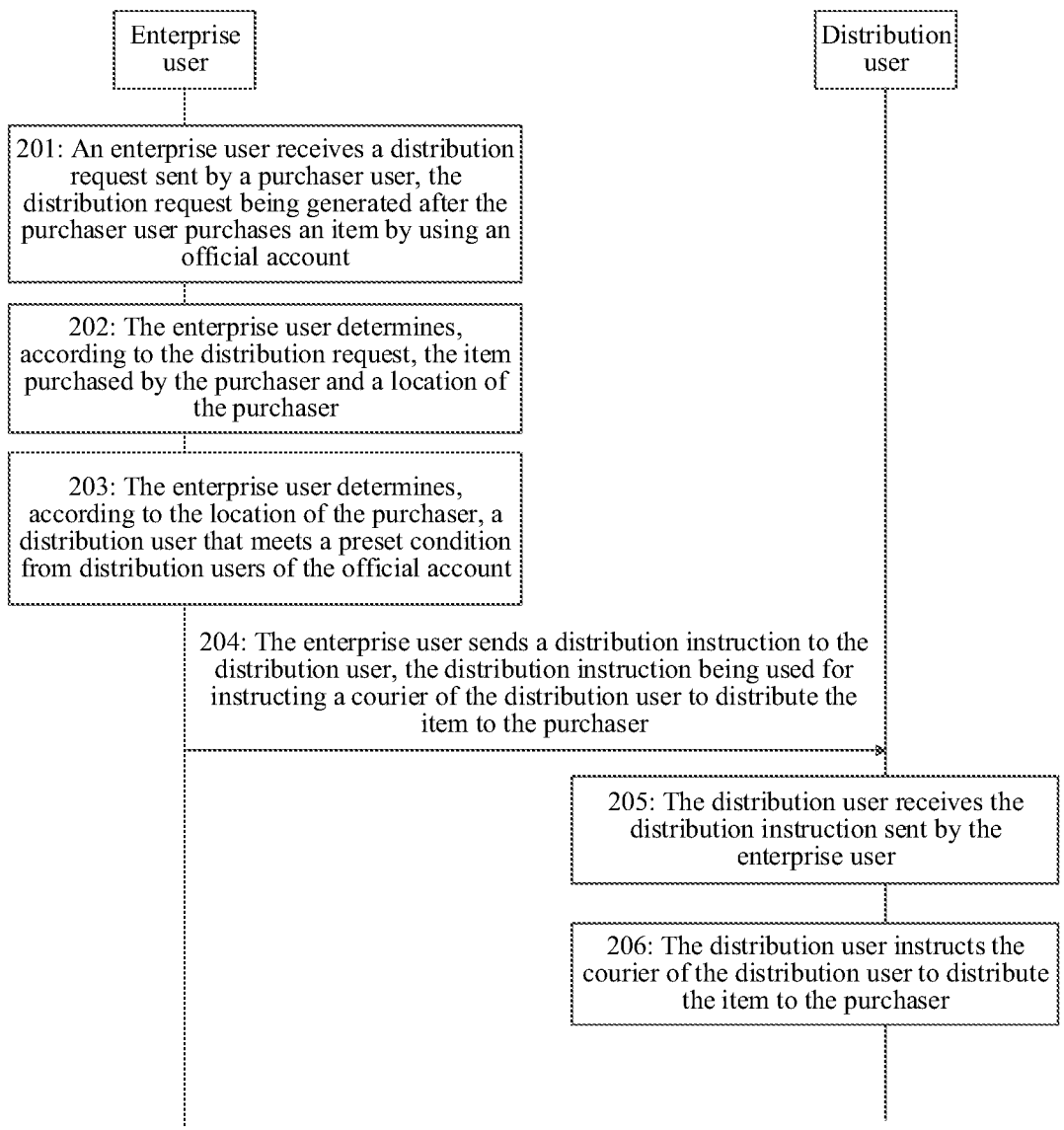
FIG. 2 is a method flowchart of an object item distribution method according to an embodiment of the present invention.

Referring to FIG. 2, FIG. 2 is a method flowchart of an object item distribution method according to an embodiment of the present invention. The object item distribution method may be applied to the implementation scenario shown in FIG. 1, or may certainly be applied to another implementation scenario. The object item distribution method includes the following steps.

Step 201: An enterprise user receives a distribution request sent by an object item requesting user, the distribution request being generated by an object item requesting user after purchasing an object item by using an official account by using an object item requesting user.

According to this embodiment of the present invention, a seller of an object item may register an official account on an information exchange platform by using an enterprise user (for ease of description, the enterprise user may be referred to as an enterprise user in which an official account s registered). That is, the official account is an identifier of the seller of the object item on the information exchange platform. An object item requesting user may follow (for example, subscribe) the official account registered by the seller of the object item. The object item requesting user may send a distribution request after successfully purchasing an object item from the enterprise user by using the following official account.

Step 202: The enterprise user determines, according to the distribution request, the object item purchased by the object item requesting user and a location of the object item requesting user.

Step 203: The enterprise user determines, according to the location of the object item requesting user, a distribution user that meets a preset condition from distribution users of the enterprise account. The distribution users of the enterprise account are, for example, distribution users that follow the official account.

Step 204: The enterprise user sends a distribution instruction to the distribution user, the distribution instruction being used for instructing a courier of the distribution user to distribute the object item to the object item requesting user.

Step 205: The distribution user receives the distribution instruction sent by the enterprise user.

Step 206: The distribution user instructs the courier of the distribution user to distribute the object item to the object item requesting user.

Steps 201 to 204 may be independently implemented as an enterprise user side embodiment, and steps 205 and 206 may be independently implemented as a distribution user side embodiment.

Based on the above, in the object item distribution method provided in this embodiment of the present invention, an object item purchased by an object item requesting user and a location of the object item requesting user is determined according to a distribution request, the distribution request being sent by an object item requesting user after successfully purchasing the object item from an enterprise user by using a following official account; a distribution user that meets a preset condition is determined, according to the location of the object item requesting user from distribution users that follow the official account; a distribution instruction is sent to the distribution user, the distribution instruction being used for instructing a courier of the distribution user to distribute the object item to the object item requesting user. The distribution user may be directly determined by using the enterprise user, and then the distribution instruction is sent to the distribution user, and the courier may be instructed to distribute the object item to the object item requesting user, thereby resolving a time consumption problem in a distribution process that a person in charge of a seller store needs to determine a nearest store according to address information filled in by an object item requesting user and notify a salesman of the nearest store to contact a courier to distribute an object item, so that distribution efficiency is improved.

Referring to FIG. 3, FIG. 3 is a method flowchart of an object item distribution method according to another embodiment of the present invention. The object item distribution method may be applied to the implementation scenario shown in FIG. 1, or may certainly be applied to another implementation scenario. The object item distribution method includes the following steps.

Step 301: An enterprise user receives object item information, a location of an object item requesting user and a second identifier of an object item requesting user that are sent by the object item requesting user, the object item information being obtained by the object item requesting user from an followed official account.

An enterprise (for example, a seller of an object item) registers an official account in advance, and publishes, by using the official account, object item information of the object item that is sold. An object item requesting user first follows (or subscribes) the official account by using an object item requesting user, and then opens a dialog interface of the official account. The dialog interface includes a shopping control. When the object item requesting user triggers the shopping control by using the object item requesting user, the object item requesting user sends a shopping page request to the enterprise user. After receiving the shopping page request, the enterprise user sends a shopping page that includes object item information of each object item to the object item requesting user. The object item requesting user presents the shopping pages. If an object item requesting user wants to purchase an object item, the object item requesting user may send object item information of the object item that is wanted to be purchased and a second identifier of an object item requesting user by using the object item requesting user to an enterprise user. The object item information includes an identifier of the object item and a quantity of the object item, and may further include description information such as brief description of the object item. This is not limited in this embodiment. The second identifier is used for uniquely identifying an object item requesting user, and may be an account (for example, an account an object item requesting user registers on an information exchange platform), an OpenID, or the like that is logged in to the on the object item requesting user. This is not limited in this embodiment.

Optionally, a pop-up window may pop up on a dialog display interface of the object item requesting user. The object item requesting user may set, in the pop-up window, whether an official account is allowed to obtain the location of the object item requesting user. When the object item requesting user sets in the pop-up window to allow the official account to obtain the location of the object item requesting user, each time the object item requesting user opens the dialog interface, the object item requesting user obtains the location of the object item requesting user and sends the location to the enterprise user. The enterprise user may arrange a courier according to the location. Specifically, the object item requesting user may send the location information to the enterprise user in a form of an XML data packet.

In a possible implementation, the XML data packet is shown as follows:

```
<xml>
<ToUserName><![CDATA[toUser]]></ToUserName>
<FromUserName><![CDATA[fromUser]]></FromUserName>
<CreateTime>123456789</CreateTime>
<MsgType><![CDATA[event]]></MsgType>
<Event><![CDATA[LOCATION]]></Event>
<Latitude>23.137466</Latitude>
<Longitude>113.352425</Longitude>
<Precision>119.385040</Precision>
</xml>
```

ToUserName is an official account, FromUserName is a WeChat account of an object item requesting user, CreateTime is message creation time, MsgType is a message type, Event is an event type, Latitude is latitude of a geographic location, Longitude is a longitude of the geographic location, and Precision is a precision of the geographic location.

A pop-up window may be displayed when a dialog interface is opened for the first time after the object item requesting user follows the official account, and is not displayed later, or may be displayed each time the dialog interface is opened. This is not limited in this embodiment. The object item requesting user may further modify settings of the pop-up window in the dialog interface of the official account.

For example, when an information exchange platform is WeChat, an enterprise may register an official account in a public platform of the WeChat in advance, and then publish, by using an enterprise user, information about an object item that is sold. When an object item requesting user follows the official account by using an object item requesting user, and opens a dialog interface of the official account by using the object item requesting user, and a "shopping" control is included in the dialog interface, the object item requesting user may click the control. In this case, the object item requesting user sends a shopping request to the enterprise user. The enterprise user returns a shopping page to the object item requesting user. After the object item requesting user selects, by using the object item requesting user, an object item that needs to be purchased, the object item requesting user sends object item information of the object item, a location of the object item requesting user, and a WeChat account of the object item requesting user to the enterprise user.

Step 302: The enterprise user generates an order according to the object item information.

Step 303: The enterprise user sends the order and the second identifier to a social networking server, the social networking server being used for instructing the object item requesting user to complete payment.

The social networking server determines the object item requesting user according to the second identifier, obtains, according to the order, an amount of money that the object item requesting user needs to pay, and instructs the object item requesting user to pay the amount of money to complete the payment.

When the information exchange platform is WeChat, the social networking server in this step may be a WeChat server.

Step 304: The enterprise user receives notification information sent by the object item requesting user after completing the payment.

After completing the payment, the object item requesting user sends notification information of the completed payment to the enterprise user. After receiving the notification information, the enterprise user may use the notification information as a distribution request, and determines that the object item needs to be distributed to the object item requesting user. That is, the distribution request is sent after the object item requesting user successfully purchases an object item from the enterprise user by using the official account. The distribution request includes a second identifier of the object item requesting user.

Optionally, after completing the payment, the social networking server, not the object item requesting user, sends the notification information of the completed payment to the enterprise user.

In this embodiment, an enterprise user needs to screen, from distribution users that follow the official account, a distribution user that meet a preset condition, and instruct a courier to distribute an object item by using the distribution user. When there is only one courier, the enterprise user directly determines the courier as the courier that meets the preset condition; or when there are at least two couriers, the enterprise user further needs to determine a courier that meets the preset condition from the at least two couriers. For example, the enterprise user may select a courier that is in an idle state, or may select a default courier, or may further select a courier according to a requirement sent by the object item requesting user, or the like. The following describes, by using the following steps, a procedure of selecting a courier.

Step 305: The enterprise user determines, according to a distribution request, the object item purchased by the object item requesting user and the location of the object item requesting user.

The enterprise user determines the object item requesting user according to the second identifier, and then reads the object item information and the location sent by the object item requesting user, and determines the object item purchased by the object item requesting user and the location of the object item requesting user.

Step 306: The enterprise user reads personal information of couriers of each distribution users of the enterprise account, the personal information including at least locations of the couriers. The distribution user of the official account may be, for example, a distribution user that follows the official account.

Usually, an enterprise user arranges a courier that is relatively near an object item requesting user to distribute an object item to the object item requesting user. In this way, not only distribution efficiency may be improved, but also distribution costs consumed by the courier can be reduced. For example, when a drug store x has stores in Beijing and Shanghai, and a location of an object item requesting user is in Shanghai, the enterprise user may arrange a courier in the store in Shanghai to distribute medicines to the object item requesting user. The courier may be an employee in an enterprise, such as a shop assistant, or may be a particular person that is temporarily hired by the enterprise for distribution, such as a courier. Because the enterprise user needs to learn a location of each courier, the location of each courier may be registered in advance in the enterprise user. Therefore, the method provided in this embodiment further includes: prestoring, by the distribution user, personal information of a courier in the enterprise user, the personal information including a location of the courier, or the personal information includes the location or a tag of the courier, the tag being used for describing classification to which the courier belongs. The tag is used for describing the classification to which the courier belongs, for example, the tag may be a service level of the courier. For example, the tag is a five-star courier or a four-star courier. Alternatively, the tag may be a career of the courier. For example, the tag is a pharmacist, a shopping assistant, or a courier. The tag is not limited in this embodiment. The tag may be obtained by the courier by setting the enterprise user, or may be generated by the enterprise user according to evaluation of the courier performed by the object item requesting user. This is not limited in this embodiment. The personal information may further include age, gender, year of working, or the like of the courier.

Step 307: The enterprise user screens, according to the locations of the couriers, a courier whose distance from the location of the object item requesting user is less than a preset distance threshold.

The preset distance threshold may be automatically set and modified. This is not limited in this embodiment.

When obtaining a courier by means of the selecting according to a location, the enterprise user determines the courier as the courier that meets the preset condition. When obtaining at least two couriers by means of the selecting according to the location, the enterprise user further needs to determine the courier that meets preset condition from the at least two courier. For example, the enterprise user may select a courier that is in an idle state, or may select a default courier, or may further select a courier according to a requirement sent by the object item requesting user.

Specifically, the determining, according to the location, a distribution user of a courier that meets a preset condition further includes:

1) If condition information sent by the object item requesting user is received, reading a tag included in personal information of each courier, the condition information being used for limiting classification to which the courier belongs, and the tag being used for describing the classification to which the courier belongs.

2) Screening a courier whose tag matches the condition information.

For example, if the condition information of the object item requesting user indicates that distribution needs to be performed by a five-star courier, the enterprise user selects, from the at least two couriers, a courier whose tag is a five-star courier. Alternatively, the object item requesting user may be unfamiliar with usage of the medicine, and it indicates by using the condition information of the object item requesting user that the distribution needs to be performed by a pharmacist, the enterprise user selects, from the at least two couriers, a courier whose tag is a pharmacist. Because a courier may be determined according to a requirement sent by the object item requesting user, a distribution process is more human-centered.

Step 308: The enterprise user sends a distribution link and a first identifier of each distribution user that is obtained by means of the selecting to the social networking server, and the social networking server pushes the distribution link to the distribution user that corresponds to each first identifier. In addition to the distribution link and the first identifier, the enterprise user may further send a service identifier to the social networking server. The social networking server determines a distribution service according to the service identifier, and pushes, according to the distribution service, the distribution link to a distribution user that corresponds to the first identifier. Because an official account of an enterprise may provide multiple services, the enterprise user may further set a service identifier for each service, and sends a correspondence between the service and the service identifier to the social networking server, so that the social networking server may determine a service type according to the service identifier.

The distribution link is used for requesting a distribution page, and the distribution link may briefly describe the distribution. The distribution page is used for describing the distribution in detail. For example, the distribution link may be text information of "distribution notification". The distribution page may include a location of an object item requesting user, graphic introduction of the purchased object item, a map between a location of a courier and the location of the object item requesting user, a predicted distribution duration, or the like.

Figure 3A:
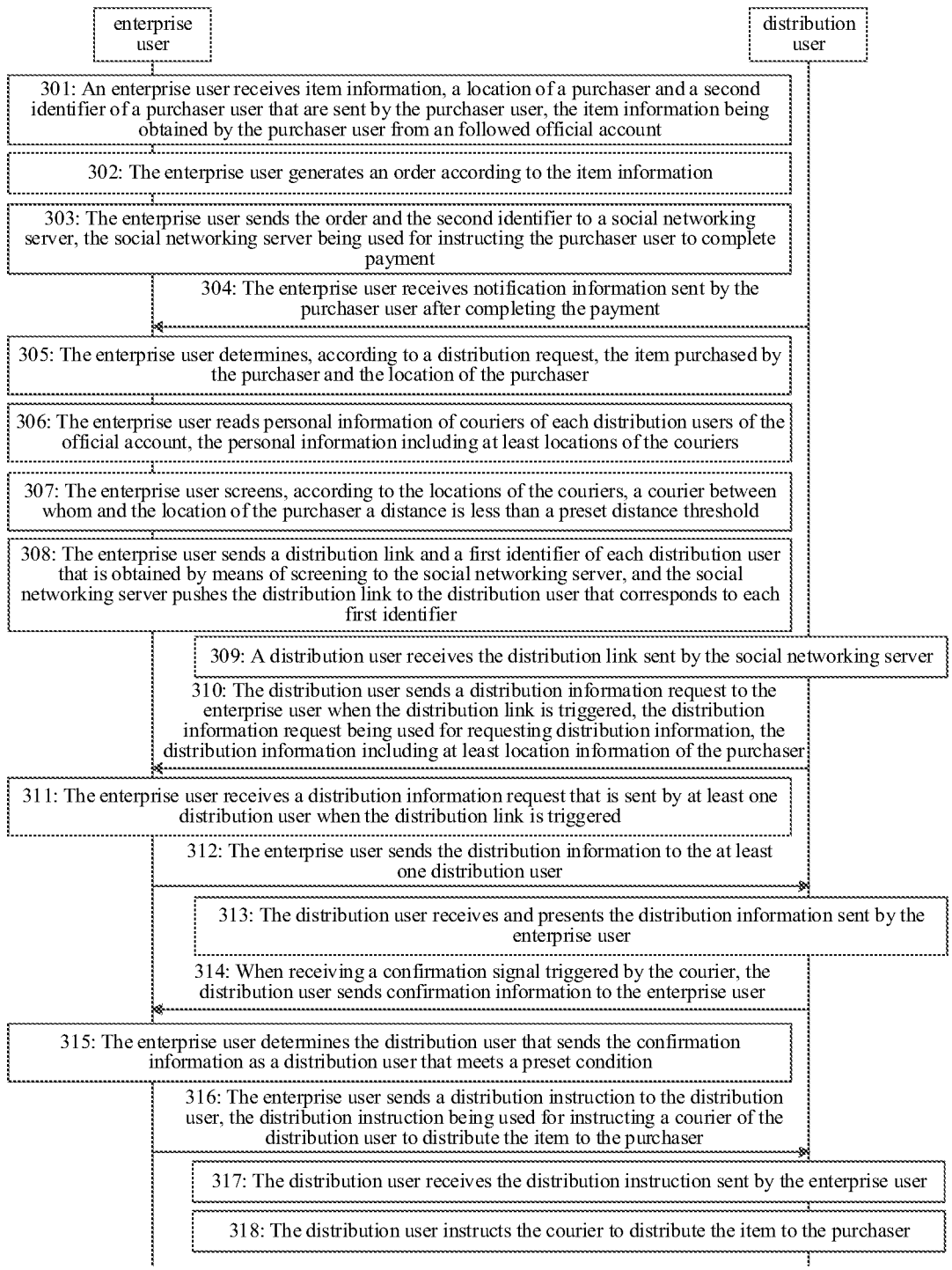
FIG. 3A is a method flowchart of an object item distribution method according to another embodiment of the present invention.
Figure 3D:
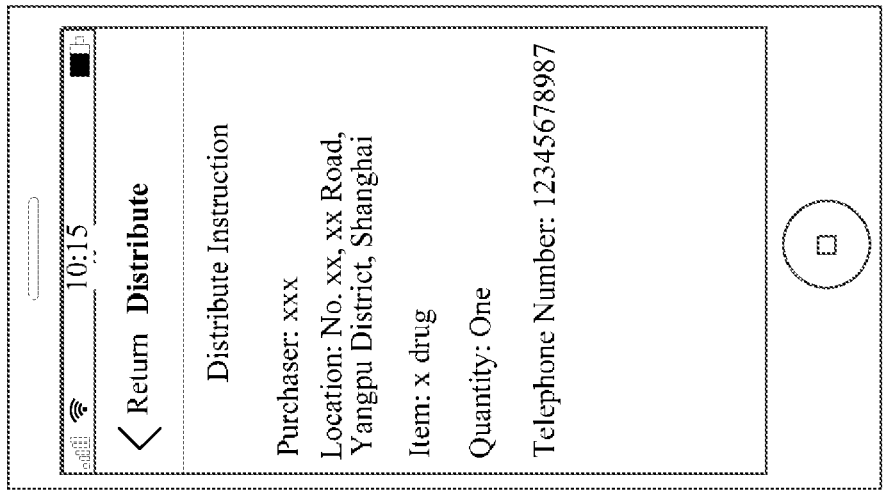
FIG. 3D is a schematic diagram for displaying a distribution instruction according to an embodiment of the present invention.
Figure 3C:
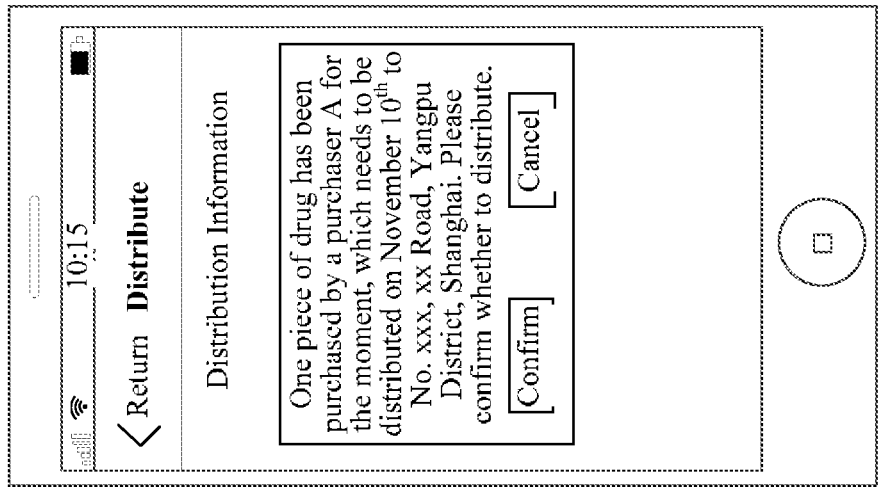
FIG. 3C is a schematic diagram for generating confirmation information according to an embodiment of the present invention.
Figure 3B:
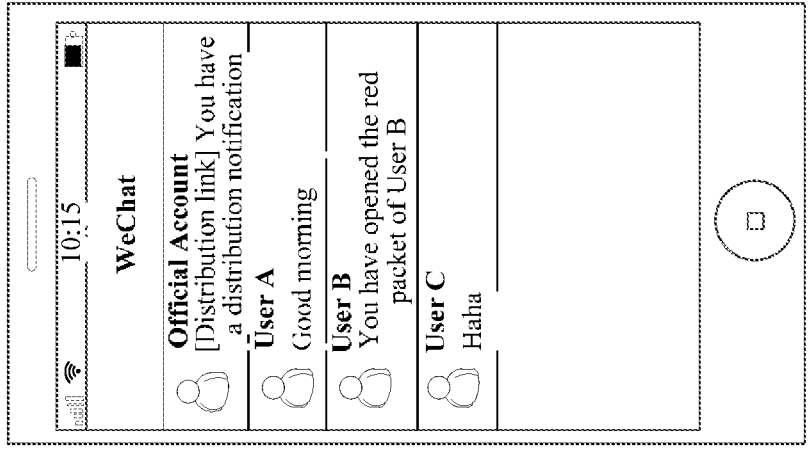
FIG. 3B is a schematic diagram of a distribution link according to an embodiment of the present invention.

For example, referring to a schematic diagram of a distribution link shown in FIG. 3B. Text information that is of a distribution link and that is received by a distribution user in the figure is "you have a distribution notification".

Optionally, the enterprise user not only may instruct the social networking server to send the distribution link to each screened distribution user, but also may instruct the social networking server to send the distribution link to all distribution users, and may also instruct the social networking server to send the distribution link to distribution user of some parties. This is not limited in this embodiment.

In a specific implementation, content of the message sent by the enterprise user to the social networking server is as follows:

```
{
    "touser": "UserID1|UserID2|UserID3",
    "toparty": " PartyID1 | PartyID2 ",
    "totag": " TagID1 | TagID2 ",
    "msgtype": "text",
    "agentid": "1",
    "text": {
        "content": "Holiday Request For Pony(http://xxxxx)"
    },
    "safe":"0"
}
```

Touser is a user ID list, and is used for storing distribution users that receive the distribution link. When there are multiple distribution users, each distribution user is separated by using '|'. When a distribution user is designated to @all, the distribution user is sent to all users that follow the enterprise. A maximum quantity of distribution users that need to send a message to users may further be set. For example, a quantity of distribution users sent is 1000 at most.

Toparty is a party ID list, used for storing parties to which the distribution users that receive the distribution link belong. When there are multiple parties, each party is separated by using '|'. When a distribution user is designated as @all, this parameter is neglected. A maximum quantity of parties that need to send a message to members may further be set. For example, a quantity of parties is 100 at most.

Totag is a tag ID list, used for storing parties to which the tags that receive the distribution link belong. When there are multiple tags, each tag is separated by using '|'. When a distribution user is designated as @all, this parameter is neglected.

Msgtype is a type of a message, and is designated as a text in this embodiment.

Agentid is a service identifier, content is content of the message, and safe represents whether the message is a secret message. For example, a numeral 0 may be set to represent no, and a numeral 1 yes. Generally, a default numeral of an enterprise user is 0.

For example, when the information exchange platform is WeChat, the enterprise user sends the distribution link, the service identifier, and a WeChat account of each distribution user to a public platform. The public platform pushes the distribution link to each distribution user.

Step 309: A distribution user receives the distribution link sent by the social networking server.

Step 310: The distribution user sends a distribution information request to the enterprise user when the distribution link is triggered, the distribution information request being used for requesting distribution information, the distribution information including at least location information of the object item requesting user.

When the courier wants to perform distribution, the courier may click the distribution link. In this case, the distribution user determines that the courier triggers the distribution link, and sends a distribution information request to the enterprise user. The distribution information request is used for requesting, from the enterprise user, a distribution page that describes the distribution in a more detailed manner.

Step 311: The enterprise user receives a distribution information request that is sent by at least one distribution user when the distribution link is triggered.

Step 312: The enterprise user sends the distribution information to the at least one distribution user.

The distribution information may include the location of the object item requesting user and the object item that needs to be distributed.

Step 313: The distribution user receives and presents the distribution information sent by the enterprise user.

Step 314: When receiving a confirmation signal triggered by the courier, the distribution user sends confirmation information to the enterprise user.

If the courier wants to distribute the object item to the object item requesting user, the confirmation signal may be triggered. After receiving the confirmation signal, the distribution user sends confirmation information for confirming the distribution to the enterprise user.

For example, referring to a schematic diagram of generating confirmation information shown in FIG. 3C. A location of an object item requesting user and transaction information are displayed in the figure. If the courier wants to perform the distribution, the courier clicks a "confirmation" control. When the distribution user determines that a confirmation signal is received, confirmation information is generated and sent to the enterprise user. If the courier does not want to perform the distribution, the courier clicks a "cancellation" control, and the procedure ends.

Step 315: The enterprise user determines the distribution user that sends the confirmation information as a distribution user that meets a preset condition.

When receiving confirmation information sent by a distribution user, the enterprise user directly determines the distribution user as the distribution user that meets the preset condition. When receiving confirmation information sent by at least two distribution users, the enterprise user determines a distribution user that first sends the confirmation information manner as the distribution user that meets the preset condition.

Step 316: The enterprise user sends a distribution instruction to the distribution user, the distribution instruction being used for instructing a courier of the distribution user to distribute the object item to the object item requesting user.

The enterprise user sends the distribution instruction to the distribution user that meets the preset condition. The distribution instruction may include the location of object item requesting user and the object item that needs to be distributed. Optionally, the distribution instruction may further include a contact manner of the object item requesting user, to facilitate contact of the courier with the object item requesting user, and improve successful rate of distribution.

For example, referring to a schematic display diagram of a distribution instruction shown in FIG. 3D. The configuration instruction in the figure includes a name of an object item requesting user, a location of the object item requesting user, a name of an object item, a quantity of the object item, a contact number, or the like.

Step 317: The distribution user receives the distribution instruction sent by the enterprise user.

Step 318: The distribution user instructs the courier to distribute the object item to the object item requesting user.

Optionally, after the sending the distribution instruction to the distribution user, the method further includes:

1) Receiving evaluation information sent by the object item requesting user, the evaluation information being generated according to a current distribution behavior of the courier.

2) Updating personal information of the courier according to the evaluation information, for example, updating a tag in the personal information.

After receiving the object item, the object item requesting user may further evaluate a current distribution behavior of the courier. For example, the object item requesting user rates the distribution behavior of the courier according to a dimension such as a distribution duration or a service attitude. The enterprise user updates, by combining a current store and historical scores, a tag that is related to a service level of the courier. In this way, the tag of the courier is related to distribution quality, so that the courier tries hard to improve the distribution quality.

For example, if a courier A distributes an object item for a fifth time, scores of the first four times are 90 points, a current score is 85 points, and a point range of a five-star courier is from 90 to 100, and a point range of a four-star courier is from 80 to 90, it is determined that a tag of the courier A is updated from a five-star courier to a four-star courier.

Optionally, the enterprise user may further send the information of the courier to the object item requesting user, to facilitate contact of the object item requesting user with the courier. The information about the courier may include the location, a contact manner, or the like of the courier.

In addition, a person skilled in the art may understand that the WeChat is a type of the information exchange platform. The information exchange platform in this disclosure may further be any other instant messaging platform.

Figure 3E:
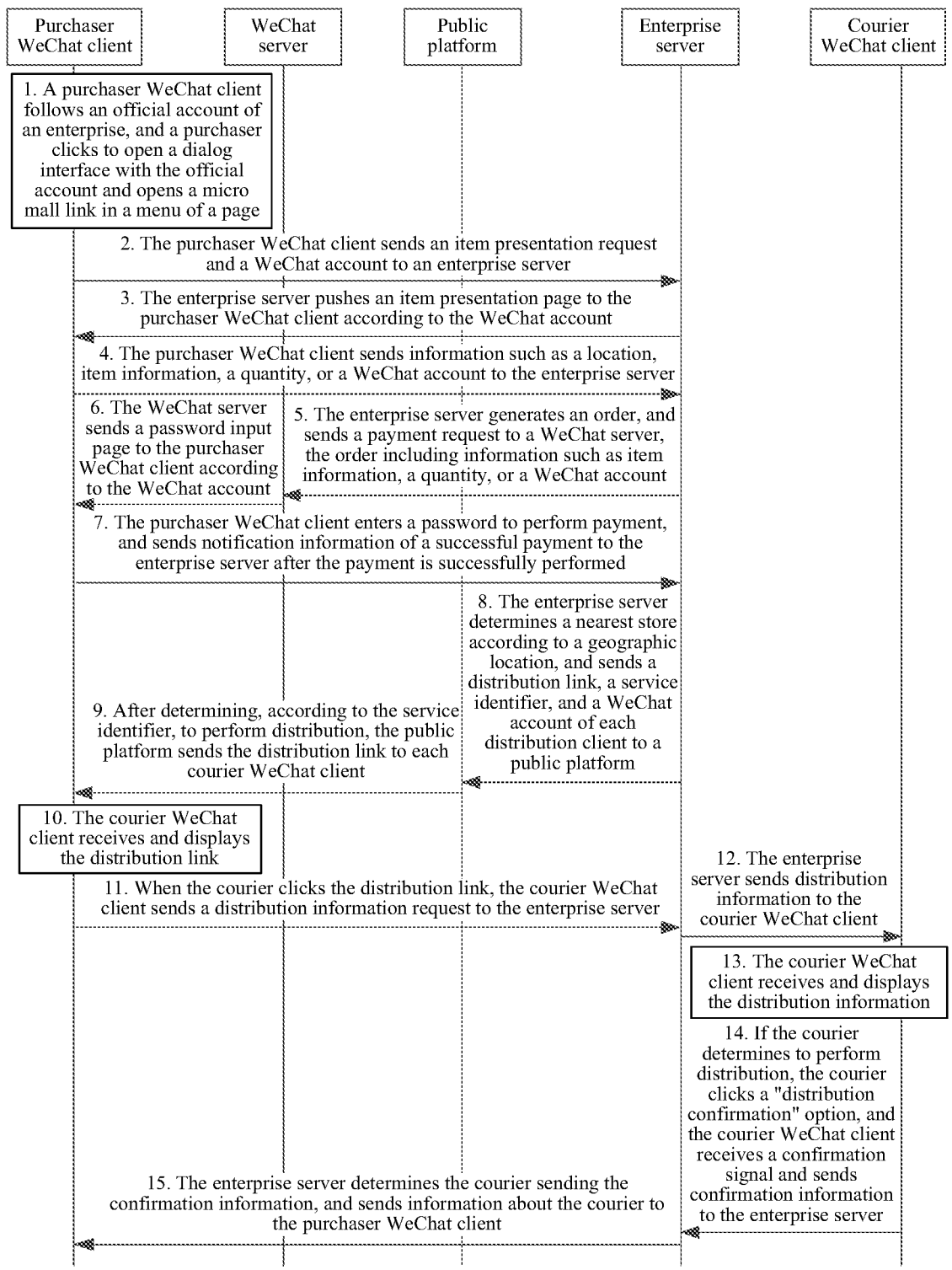
FIG. 3E is a schematic diagram for applying an object item distribution method according to still another embodiment of the present invention.

Referring to FIG. 3E, FIG. 3E shows an object item distribution method according to another embodiment of the present invention. The object item distribution method relates to an object item requesting user WeChat client, a WeChat server, an enterprise user, a public platform, and a courier WeChat client.

1. The object item requesting user WeChat client follows an official account of an enterprise, and an object item requesting user clicks to open a dialog interface with the official account and opens a micro mall link in a menu of a page.

The micro mall link is a shopping control.

2. The object item requesting user WeChat client sends an object item presentation request and a WeChat account to an enterprise user.

3. The enterprise user pushes an object item presentation page to the object item requesting user WeChat client according to the WeChat account.

4. The object item requesting user WeChat client sends information such as a location, object item information, a quantity, or a WeChat account to the enterprise user.

5. The enterprise user generates an order, and sends a payment request to a WeChat server, the order including information such as object item information, a quantity, or a WeChat account.

6. The WeChat server sends a password input page to the object item requesting user WeChat client according to the WeChat account.

7. The object item requesting user WeChat client enters a password to perform payment, and sends notification information of a successful payment to the enterprise user after the payment is successfully performed.

8. The enterprise user determines a nearest store according to a geographic location, and sends a distribution link, a service identifier, and a WeChat account of each distribution user to a public platform.

9. After determining, according to the service identifier, to perform distribution, the public platform sends the distribution link to each courier WeChat client.

10. The courier WeChat client receives and displays the distribution link.

11. When the courier clicks the distribution link, the courier WeChat client sends a distribution information request to the enterprise user.

12. The enterprise user sends distribution information to the courier WeChat client.

13. The courier WeChat client receives and displays the distribution information.

14. If the courier determines to perform distribution, the courier clicks a "distribution confirmation" option, and the courier WeChat client receives a confirmation signal and sends confirmation information to the enterprise user.

15. The enterprise user determines the courier sending the confirmation information, and sends information about the courier to the object item requesting user WeChat client.

The information about the courier may include the location, a contact manner, or the like of the courier.

Optionally, the public platform may be disposed in a WeChat server. The WeChat includes a payment platform and a public platform. The payment platform is used to process operations that are related to payment and a password in steps 5 and 6. The official account of the enterprise is registered in the public platform. In this way, the WeChat server in FIG. 3 is replaced with the payment platform.

Based on the above, in the object item distribution method provided in this embodiment of the present invention, an object item purchased by an object item requesting user and a location of the object item requesting user is determined according to a distribution request, the distribution request being sent by an object item requesting user after successfully purchasing the object item from an enterprise user by using a following official account; a distribution user that meets a preset condition is determined, according to the location of the object item requesting user from distribution users that follow the official account; a distribution instruction is sent to the distribution user, the distribution instruction being used for instructing a courier of the distribution user to distribute the object item to the object item requesting user. The distribution user may be directly determined by using the enterprise user, and then the distribution instruction is sent to the distribution user, and the courier may be instructed to distribute the object item to the object item requesting user, thereby resolving a time consumption problem in a distribution process that a person in charge of a seller store needs to determine a nearest store according to address information filled in by an object item requesting user and notify a salesman of the nearest store to contact a courier to distribute an object item, so that distribution efficiency is improved.

In addition, by selecting, according to the location of the courier, the courier whose distance from the location of the object item requesting user is less than a preset distance threshold, the enterprise user arranges a courier that is relatively near to the object item requesting user to distribute the object item to the object item requesting user. In this way, not only can distribution efficiency be improved, but also distribution costs cost by the courier can be reduced.

In addition, by reading a tag included in personal information of each courier by receiving the condition information sent by the object item requesting user, and by selecting a courier whose tag matches the condition information, a courier may be determined according to a requirement of the object item requesting user, so that the distribution process is more human-centered.

In addition, by updating the tag in the personal information of the courier according to the evaluation information sent by the object item requesting user, the tag of each courier is related to distribution quality, so that the courier tries hard to improve the distribution quality.

Figure 4:
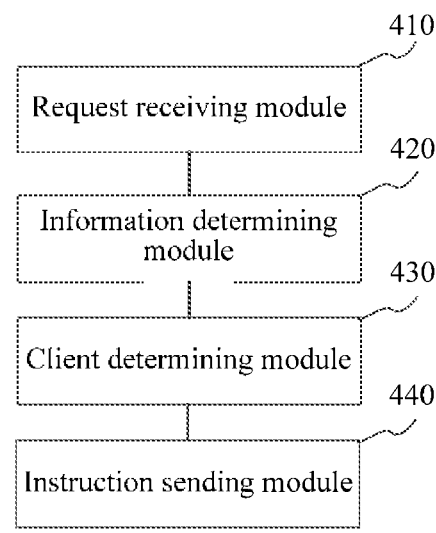
FIG. 4 is a structural block diagram of an object item distribution apparatus according to an embodiment of the present invention.

Referring to FIG. 4, FIG. 4 is a structural block diagram of an object item distribution apparatus according to an embodiment of the present invention. The object item distribution apparatus may be applied to the enterprise user shown in FIG. 1. The object item distribution apparatus includes:

a request receiving module 410, configured to receive a distribution request sent by an object item requesting user;

an information determining module 420, configured to determine an object item purchased by an object item requesting user and a location of the object item requesting user according to the distribution request obtained by the request receiving module;

a client determining module 430, configured to determine, according to the location that is of the object item requesting user and that is determined by the information determining module 420, a distribution user that is of a courier and that meets a preset condition; and an instruction sending module 440, configured to send a distribution instruction to the distribution user determined by the client determining module 430, the distribution instruction being used for instructing the courier to distribute the object item to the object item requesting user.

Based on the above, according to the object item distribution apparatus provided in this embodiment of the present invention, an object item purchased by an object item requesting user and a location of the object item requesting user is determined according to a distribution request, the distribution request being sent by an object item requesting user after successfully purchasing the object item from an enterprise user by using a following official account; a distribution user that meets a preset condition is determined, according to the location of the object item requesting user from distribution users that follow the official account; a distribution instruction is sent to the distribution user, the distribution instruction being used for instructing a courier of the distribution user to distribute the object item to the object item requesting user. The distribution user may be directly determined by using the enterprise user, and then the distribution instruction is sent to the distribution user, and the courier may be instructed to distribute the object item to the object item requesting user, thereby resolving a time consumption problem in a distribution process that a person in charge of a seller store needs to determine a nearest store according to address information filled in by an object item requesting user and notify a salesman of the nearest store to contact a courier to distribute an object item, so that distribution efficiency is improved.

Figure 5:
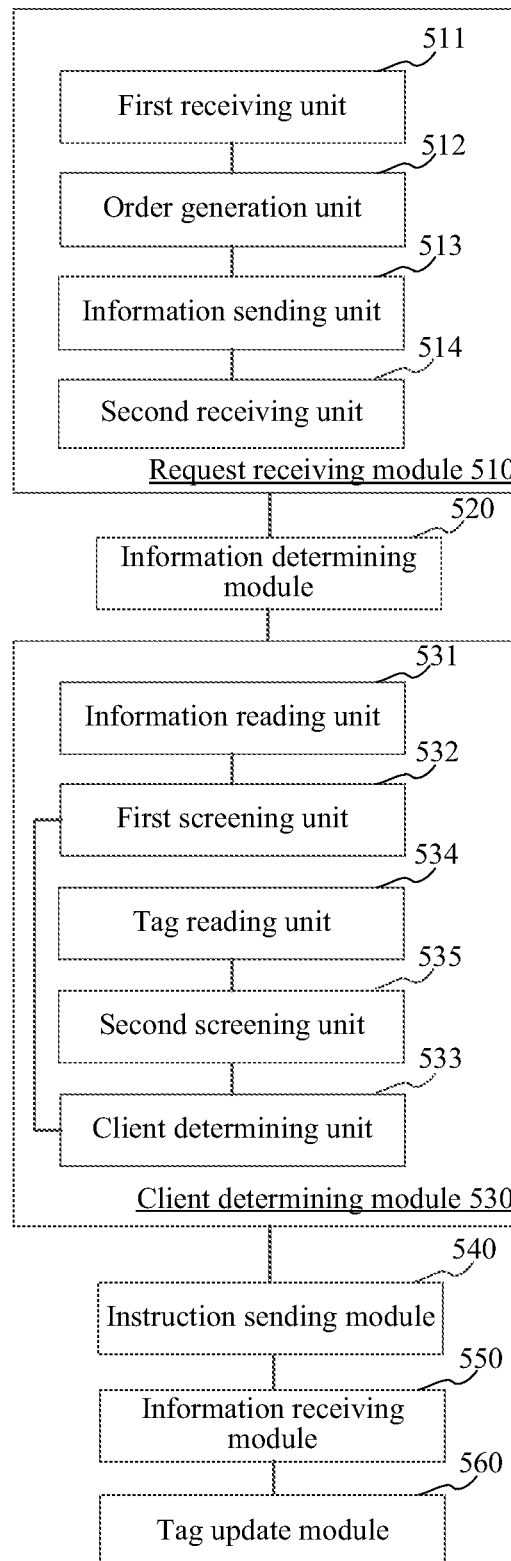
FIG. 5 is a structural block diagram of an object item distribution apparatus according to another embodiment of the present invention.

Referring to FIG. 5, FIG. 5 is a structural block diagram of an object item distribution apparatus according to another embodiment of the present invention. The object item distribution apparatus may be applied to the enterprise user shown in FIG. 1. The object item distribution apparatus includes: a request receiving module 510, an information determining module 520, a client determining module 530, and an instruction sending module 540.

The request receiving module 510 is configured to receive a distribution request sent by an object item requesting user, the distribution request being generated after the object item requesting user purchases an object item by using the object item requesting user and by using an official account, the official account being an identifier of a seller of the object item on an information exchange platform.

The information determining module 520 is configured to determine the object item purchased by the object item requesting user and a location of the object item requesting user according to the distribution request obtained by the request receiving module.

The client determining module 530 is configured to determine, according to the location that is of the object item requesting user and that is determined by the information determining module 520, a distribution user that meets a preset condition from distribution users of the enterprise account.

The instruction sending module 540 is configured to send a distribution instruction to the distribution user that meets the preset condition and that is determined by the client determining module 530, the distribution instruction being used for instructing a courier of the distribution user that meets the preset condition to distribute the object item to the object item requesting user.

Optionally, the client determining module 530 includes:

an information reading unit 531, configured to read personal information of couriers of the distribution user of the official account, the personal information including at least locations of the couriers;

a first selecting unit 532, configured to screen, according to the locations of the couriers, a courier whose distance from the location of the object item requesting user is less than a preset distance threshold; and a client determining unit 533, configured to determine the distribution user that is of the courier and that is obtained by the first selecting unit 532 by means of the selecting as the distribution user that meets the preset condition.

Optionally, the client determining module 530 further includes:

a tag reading unit 534, configured to: when condition information sent by the object item requesting user is received, read a tag included in personal information of each courier, the condition information being used for limiting classification to which the courier belongs, and the tag being used for describing the classification to which the courier belongs; and a second selecting unit 535, configured to select a courier according to the condition information sent by the object item requesting user, for example, screen a courier that is obtained by the tag reading unit 534 and whose tag matches the condition information.

Optionally, the object item distribution apparatus provided in this embodiment further includes:

an information receiving module 550, configured to: after the instruction sending module 540 sends a distribution instruction to the distribution user, receive evaluation information sent by the object item requesting user, the evaluation information being generated according to a current distribution behavior of the courier; and a tag update module 560, configured to update the personal information of the courier according to the evaluation information received by the information receiving module 550, for example, update the tag in the personal information.

Optionally, the client determining unit 533 is specifically configured to:

read personal information of couriers of the plurality of distribution users of the enterprise account, the personal information comprising at least locations of the couriers;

screen, according to the locations of the couriers, a courier whose distance from the location of the object item requesting user is less than a preset distance threshold;

send a distribution link and first identifiers of the distribution users obtained by means of the selecting to a social networking server, and push, by the social networking server, the distribution link to a distribution user that corresponds to each first identifier;

receive a distribution information request sent by at least one distribution user when the distribution link is triggered, the distribution information request being used for requesting distribution information, the distribution information comprising at least location information of the object item requesting user;

send the distribution information to the at least one distribution user; and determine a distribution user that sends confirmation information for responding to the distribution information as the distribution user that meets the preset condition.

Optionally, the request receiving module 510 includes:

a first receiving unit 511, configured to receive object item information of the object item purchased by the object item requesting user, the location of the object item requesting user, and a second identifier of the object item requesting user, the object item information being obtained by the object item requesting user by using the official account;

an order generation unit 512, configured to generate an order according to the object item information received by the first receiving unit 511;

an information sending unit 513, configured to send the order generated by the order generation unit 512 and the second identifier to the official account of the social networking application, so that the social networking server instructs the object item requesting user to complete payment; and a second receiving unit 514, configured to receive notification information sent by the object item requesting user after completing the payment.

Based on the above, according to the object item distribution apparatus provided in this embodiment of the present invention, an object item purchased by an object item requesting user and a location of the object item requesting user is determined according to a distribution request, the distribution request being sent by an object item requesting user after successfully purchasing the object item from an enterprise user by using a following official account; a distribution user that meets a preset condition is determined, according to the location of the object item requesting user from distribution users that follow the official account; a distribution instruction is sent to the distribution user, the distribution instruction being used for instructing a courier of the distribution user to distribute the object item to the object item requesting user. The distribution user may be directly determined by using the enterprise user, and then the distribution instruction is sent to the distribution user, and the courier may be instructed to distribute the object item to the object item requesting user, thereby resolving a time consumption problem in a distribution process that a person in charge of a seller store needs to determine a nearest store according to address information filled in by an object item requesting user and notify a salesman of the nearest store to contact a courier to distribute an object item, so that distribution efficiency is improved.

In addition, by selecting, according to the location of the courier, the courier whose distance from the location of the object item requesting user is less than a preset distance threshold, the enterprise user arranges a courier that is relatively near to the object item requesting user to distribute the object item to the object item requesting user. In this way, not only can distribution efficiency be improved, but also distribution costs cost by the courier can be reduced.

In addition, by reading a tag included in personal information of each courier by receiving the condition information sent by the object item requesting user, and by selecting a courier whose tag matches the condition information, a courier may be determined according to a requirement of the object item requesting user, so that the distribution process is more human-centered.

In addition, by updating the tag in the personal information of the courier according to the evaluation information sent by the object item requesting user, the tag of each courier is related to distribution quality, so that the courier tries hard to improve the distribution quality.

Figure 6:
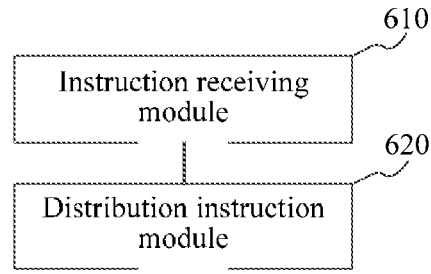
FIG. 6 is a structural block diagram of an object item distribution apparatus according to still another an embodiment of the present invention.

Referring to FIG. 6, FIG. 6 is a structural block diagram of an object item distribution apparatus according to an embodiment of the present invention. The object item distribution apparatus may be applied to the distribution user shown in FIG. 1. The object item distribution apparatus includes:

an instruction receiving module 610, configured to receive a distribution instruction sent by an enterprise user in which an official account is registered, the distribution instruction being sent by an object item requesting user after successfully purchases an object item from the enterprise user by using the official account and sends a distribution request, and after the enterprise user determines, according to the distribution request, the object item purchased by the object item requesting user and a location of the object item requesting user and determines, according to the location of the object item requesting user, a distribution user that meets a preset condition from distribution users that follow the official account, the official account being a public social networking identifier created by a user or an organization on an information exchange platform; and a distribution instruction module 620, configured to instruct a courier of the distribution user to distribute the object item to the object item requesting user.

Based on the above, according to the object item distribution apparatus provided in this embodiment of the present invention, a distribution instruction that is sent by an enterprise user in which an official account is registered is received, the distribution instruction being sent by an object item requesting user after successfully purchases an object item from the enterprise user by using the official account and sends a distribution request, and after the enterprise user determines, according to the distribution request, the object item purchased by the object item requesting user and a location of the object item requesting user and determines, according to the location of the object item requesting user, a distribution user that meets a preset condition from distribution users that follow the official account, the official account being a public social networking identifier created by a user or an organization on an information exchange platform; and a courier of the distribution user is instructed to distribute the object item to the object item requesting user. The distribution user may be directly determined by using the enterprise user, and then the distribution instruction is sent to the distribution user, and the courier may be instructed to distribute the object item to the object item requesting user, thereby resolving a time consumption problem in a distribution process that a person in charge of a seller store needs to determine a nearest store according to address information filled in by an object item requesting user and notify a salesman of the nearest store to contact a courier to distribute an object item, so that distribution efficiency is improved.

Figure 7:
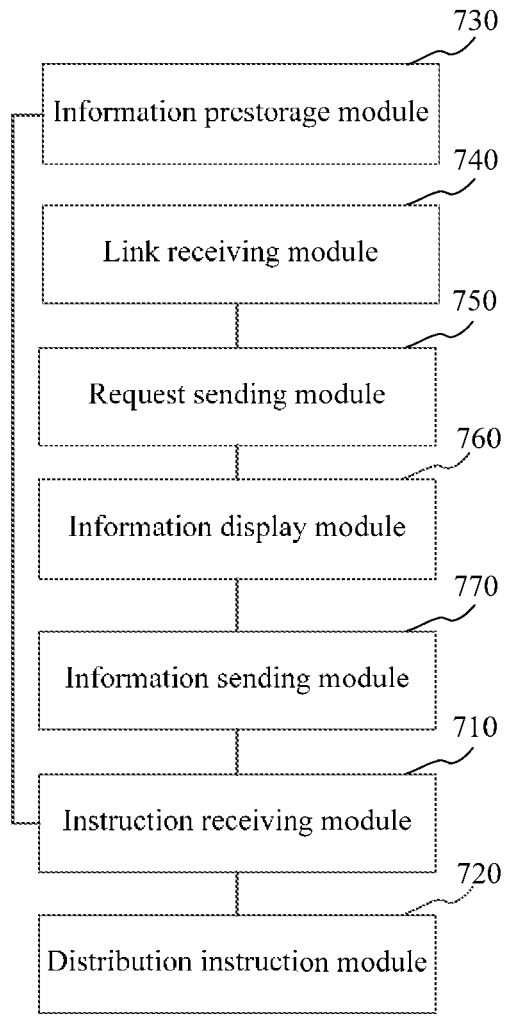
FIG. 7 is a structural block diagram of an object item distribution apparatus according to yet another embodiment of the present invention.

Referring to FIG. 7, FIG. 7 is a structural block diagram of an object item distribution apparatus according to another embodiment of the present invention. The object item distribution apparatus may be applied to the distribution user shown in FIG. 1. The object item distribution apparatus includes an instruction receiving module 710 and a distribution instruction module 720.

The instruction receiving module 710 is configured to receive a distribution instruction sent by an enterprise user, the distribution instruction being sent by the enterprise user after receiving a distribution request sent by an object item requesting user, determining an object item purchased by an object item requesting user and a location of the object item requesting user according to the distribution request, and after determining, according to the location the object item requesting user, a distribution user that meets a preset condition from distribution users of an official account, the distribution request being generated by the object item requesting user after purchasing the object item by using the object item requesting user and by using the official account, and the official account being an identifier created by a seller of the object item on an information exchange platform.

The distribution instruction module 720 is configured to instruct a courier of the distribution user to distribute the object item to the object item requesting user.

Optionally, the object item distribution apparatus provided in this embodiment further includes:

an information prestorage module 730, configured to: before the instruction receiving module 710 receives the distribution instruction sent by the enterprise user in which the official account is registered, prestore personal information of a courier in the enterprise user, the personal information including a location of the courier, or the personal information including the location and a tag of the courier, the tag being used for describing a group to which the courier belongs.

Optionally, the object item distribution apparatus provided in this embodiment further includes:

a link receiving module 740, configured to: before the instruction receiving module 710 receives the distribution instruction sent by the enterprise user, receive a distribution link sent by a social networking server, and the social networking server receives the distribution link sent by the enterprise user and first identifiers of the distribution users that are obtained by means of the selecting and sends the distribution link after determining the distribution user according to the first identifiers;

a request sending module 750, configured to: when the distribution link that is obtained by the link receiving module 740 is triggered, send a distribution information request to the enterprise user, the distribution information request being used for requesting distribution information, the distribution information comprising at least location information of the object item requesting user;

an information presentation module 760, configured to receive and present the distribution information sent by the enterprise user; and an information sending module 770, configured to send confirmation information to the enterprise user when a confirmation signal that is triggered by the courier is received.

Based on the above, according to the object item distribution apparatus provided in this embodiment of the present invention, a distribution instruction that is sent by an enterprise user in which an official account is registered is received, the distribution instruction being sent by an object item requesting user after successfully purchases an object item from the enterprise user by using the official account and sends a distribution request, and after the enterprise user determines, according to the distribution request, the object item purchased by the object item requesting user and a location of the object item requesting user and determines, according to the location of the object item requesting user, a distribution user that meets a preset condition from distribution users that follow the official account, the official account being a public social networking identifier created by a user or an organization on an information exchange platform; and a courier of the distribution user is instructed to distribute the object item to the object item requesting user. The distribution user may be directly determined by using the enterprise user, and then the distribution instruction is sent to the distribution user, and the courier may be instructed to distribute the object item to the object item requesting user, thereby resolving a time consumption problem in a distribution process that a person in charge of a seller store needs to determine a nearest store according to address information filled in by an object item requesting user and notify a salesman of the nearest store to contact a courier to distribute an object item, so that distribution efficiency is improved.

It should be noted that when performing object item distribution, the object item distribution apparatus provided in the foregoing embodiments is merely described by using an example of division of the foregoing functional modules. During actual application, the foregoing functions may be allocated to different functional modules to be completed according to a requirement, that is, an inner structure of the object item distribution apparatus is divided into different functional modules to complete all or some of the functions described above. In addition, the object item distribution apparatus provided in the foregoing embodiments and the embodiments of the object item distribution method fall within a same conception. For details of a specific implementation process, refer to the method embodiments, and details are not described herein again.

The sequence numbers of the foregoing embodiments of the present invention are merely for the convenience of description, and do not imply the preference among the embodiments.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely exemplary embodiments of the present invention, but are not intended to limit the present disclosure. Any modification, equivalent replacement, and improvement made without departing from the spirit and principle of the present disclosure shall fall within the protection scope of the present disclosure.

What is claimed is:

1. A method performed at a computer server having one or more processors and memory storing a plurality of programs to be executed by the one or more processors, wherein the computer server hosts a social networking application with which an enterprise user has (i) an official account that is a subscription-based user account at the social networking application and subscribed to by a plurality of requesting users of the social networking application, each requesting user having established a subscription relationship with the official account and registered a bank account with the social networking application, and (ii) an enterprise account that is subscribed to by a plurality of distribution users of the social networking application for distributing items sold by the enterprise user to the requesting users through the official account, the method comprising:
receiving a distribution request sent by a requesting user subscribed to the official account from a requesting mobile terminal, the distribution request being generated after the requesting user purchases an object item on the official account of the social networking application by using the requesting user's account at the social networking application;
determining, according to the distribution request, the object item purchased by the requesting user and a location of the requesting user;
obtaining personal information of a subset of the plurality of distribution users of the enterprise account, the personal information including at least locations of the subset of the plurality of distribution users;
selecting, according to the locations of the subset of the plurality of distribution users, a distribution user whose distance from the location of the requesting user is less than a preset distance threshold; and
sending a distribution instruction to the distribution user that meets the preset condition, the distribution instruction being used for instructing a courier of the distribution user that meets the preset condition to distribute the object item to the object item requesting user.

2. The method according to claim 1, wherein the operation of selecting, according to the locations of the subset of the plurality of distribution users, a distribution user whose distance from the location of the requesting user is less than a preset distance threshold further comprises:
determining a courier according to condition information sent by the requesting mobile terminal used by the requesting user, the condition information being used for limiting classification to which the courier belongs.

3. The method according to claim 1, further comprising:
after sending the distribution instruction to the distribution user that meets the preset condition:
receiving evaluation information sent by the requesting mobile terminal used by the requesting user, the evaluation information being generated according to a current distribution behavior of the courier; and
updating the personal information of the courier according to the evaluation information.

4. The method according to claim 1, wherein the operation of receiving a distribution request sent by a requesting user subscribed to the official account from a requesting mobile terminal to the official account comprises:
receiving information of the item purchased by the requesting user, the location of the requesting mobile terminal used by the requesting user, and a second identifier of the requesting user that are sent by the requesting user, wherein the information of the item is obtained by the requesting user from the official account;
generating an order according to the information;
sending the order and the second identifier to the official account of the social networking application, so that the official account of the social networking application instructs the requesting user to complete payment; and
receiving notification information sent by the requesting user after completion of the payment.

5. The method according to claim 1, wherein there is a mapping relationship between the official account of the enterprise user and the enterprise account of the enterprise user.

6. The method according to claim 1, wherein the enterprise account of the enterprise user is an invitation-based user account at the social networking application and an affiliation relationship is established after an individual user accepts an invitation to register with the enterprise account of the enterprise user and the individual user is labeled as a distribution user after verifying that the individual user has registered a bank account with the social networking application.

7. A computer server hosting a social networking application for object item distribution, wherein an enterprise user of the social networking application has (i) an official account that is a subscription-based user account at the social networking application and subscribed to by a plurality of requesting users of the social networking application, each requesting user having established a subscription relationship with the official account and registered a bank account with the social networking application, and (ii) an enterprise account that is subscribed to by a plurality of distribution users of the social networking application for distributing items sold by the enterprise user to the requesting users through the official account, the computer server comprising:
one or more processors;
memory; and
a plurality of programs stored in the memory that are configured to be executed by the one or more processors and cause the computer server to perform a plurality of operations including:
receiving a distribution request sent by a requesting user subscribed to the official account from a requesting mobile terminal, the distribution request being generated after the requesting user purchases an object item on the official account of the social networking application by using the requesting user's account at the social networking application;
determining, according to the distribution request, the object item purchased by the requesting user and a location of the requesting user;
obtaining personal information of a subset of the plurality of distribution users of the enterprise account, the personal information including at least locations of the subset of the plurality of distribution users;

selecting, according to the locations of the subset of the plurality of distribution users, a distribution user whose distance from the location of the requesting user is less than a preset distance threshold; and sending a distribution instruction to the distribution user that meets the preset condition, the distribution instruction being used for instructing a courier of the distribution user that meets the preset condition to distribute the object item to the object item requesting user.

8. The computer server according to claim 7, wherein the operation of selecting, according to the locations of the subset of the plurality of distribution users, a distribution user whose distance from the location of the requesting user is less than a preset distance threshold further comprises:

determining a courier according to condition information sent by the requesting mobile terminal used by the requesting user, the condition information being used for limiting classification to which the courier belongs.

9. The computer server according to claim 7, wherein the plurality of operations further comprise:

after sending the distribution instruction to the distribution user that meets the preset condition:

receiving evaluation information sent by the requesting mobile terminal used by the requesting user, the evaluation information being generated according to a current distribution behavior of the courier; and updating the personal information of the courier according to the evaluation information.

10. The computer server according to claim 7, wherein the operation of receiving a distribution request sent by a requesting user subscribed to the official account from a requesting mobile terminal to the official account comprises:

receiving information of the item purchased by the requesting user, the location of the requesting mobile terminal used by the requesting user, and a second identifier of the requesting user that are sent by the requesting user, wherein the information of the item is obtained by the requesting user from the official account;

generating an order according to the information;

sending the order and the second identifier to the official account of the social networking application, so that the official account of the social networking application instructs the requesting user to complete payment; and receiving notification information sent by the requesting user after completion of the payment.

11. The computer server according to claim 7, wherein there is a mapping relationship between the official account of the enterprise user and the enterprise account of the enterprise user.

12. The computer server according to claim 7, wherein the enterprise account of the enterprise user is an invitation-based user account at the social networking application and an affiliation relationship is established after an individual user accepts an invitation to register with the enterprise account of the enterprise user and the individual user is labeled as a distribution user after verifying that the individual user has registered a bank account with the social networking application.

13. A non-transitory computer readable storage medium in connection with a computer server having one or more processors, the storage medium storing a plurality of programs for hosting a social networking application, wherein an enterprise user of the social networking application has (i) an official account that is a subscription-based user account at the social networking application and subscribed to by a plurality of requesting users of the social networking application, each requesting user having established a subscription relationship with the official account and registered a bank account with the social networking application, and (ii) an enterprise account that is subscribed to by a plurality of distribution users of the social networking application for distributing items sold by the enterprise user to the requesting users through the official account, wherein the plurality of programs, when executed by the one or more servers, cause the computer server to perform a plurality of operations including:

receiving a distribution request sent by a requesting user subscribed to the official account from a requesting mobile terminal, the distribution request being generated after the requesting user purchases an object item on the official account of the social networking application by using the requesting user's account at the social networking application;

determining, according to the distribution request, the object item purchased by the requesting user and a location of the requesting user;

obtaining personal information of a subset of the plurality of distribution users of the enterprise account, the personal information including at least locations of the subset of the plurality of distribution users;

selecting, according to the locations of the subset of the plurality of distribution users, a distribution user whose distance from the location of the requesting user is less than a preset distance threshold; and sending a distribution instruction to the distribution user that meets the preset condition, the distribution instruction being used for instructing a courier of the distribution user that meets the preset condition to distribute the object item to the object item requesting user.

14. The non-transitory computer readable storage medium according to claim 13, wherein the operation of selecting, according to the locations of the subset of the plurality of distribution users, a distribution user whose distance from the location of the requesting user is less than a preset distance threshold further comprises:

determining a courier according to condition information sent by the requesting mobile terminal used by the requesting user, the condition information being used for limiting classification to which the courier belongs.

15. The non-transitory computer readable storage medium according to claim 13, wherein the plurality of operations further comprise:

after sending the distribution instruction to the distribution user that meets the preset condition:

receiving evaluation information sent by the requesting mobile terminal used by the requesting user, the evaluation information being generated according to a current distribution behavior of the courier; and updating the personal information of the courier according to the evaluation information.

16. The non-transitory computer readable storage medium according to claim 13, wherein the operation of receiving a distribution request sent by a requesting user subscribed to the official account from a requesting mobile terminal to the official account comprises:

receiving information of the item purchased by the requesting user, the location of the requesting mobile terminal used by the requesting user, and a second identifier of the requesting user that are sent by the requesting user, wherein the information of the item is obtained by the requesting user from the official account;

generating an order according to the information;
sending the order and the second identifier to the official account of the social networking application, so that the official account of the social networking application instructs the requesting user to complete payment; and
receiving notification information sent by the requesting user after completion of the payment.

17. The non-transitory computer readable storage medium according to claim 13, wherein the enterprise account of the enterprise user is an invitation-based user account at the social networking application and an affiliation relationship is established after an individual user accepts an invitation to register with the enterprise account of the enterprise user and the individual user is labeled as a distribution user after verifying that the individual user has registered a bank account with the social networking application.

* * * * *